United States Patent

Giangrasso

[11] Patent Number: 6,000,688
[45] Date of Patent: Dec. 14, 1999

[54] MACHINISTS' PRODUCTION V-BLOCK

[76] Inventor: Joseph A. Giangrasso, 11221 Elvessa St., Oakland, Calif. 94605

[21] Appl. No.: 09/236,174
[22] Filed: Jan. 25, 1999
[51] Int. Cl.[6] .................................................. B25B 5/04
[52] U.S. Cl. .............................. 269/43; 269/268; 269/95; 269/252; 269/902
[58] Field of Search .......................... 269/43, 87.3, 902, 269/268, 95, 252; 408/104, 72 R, 97; 409/219, 903

[56] References Cited

U.S. PATENT DOCUMENTS

| | | | |
|---|---|---|---|
| 4,005,945 | 2/1977 | Gutman | 269/902 |
| 4,139,189 | 2/1979 | Wietrzyk | 269/902 |
| 4,623,156 | 11/1986 | Moisson et al. | 269/902 |
| 4,650,379 | 3/1987 | Jaskolski | 269/902 |
| 5,149,071 | 9/1992 | Oliviera | 269/43 |
| 5,172,896 | 12/1992 | Beere | 269/902 |
| 5,358,228 | 10/1994 | Beere | 269/902 |

*Primary Examiner*—Robert C. Watson
*Attorney, Agent, or Firm*—Linval B. Castle

[57] ABSTRACT

A production V-block including four or more individually vertically adjustable V-blocks on a single ferromagnetic base for magnetically securing to a machine tool table, all of the V-blocks are ground to identical depths for simultaneous identical operations on several work pieces.

5 Claims, 2 Drawing Sheets

MACHINISTS' PRODUCTION V-BLOCK

This invention relates to machine tools and particularly to a multi-jawed V-block unit for independently securing several assorted circular work pieces to a table for machining operations.

BRIEF SUMMARY OF THE INVENTION

At any time that machining is to be performed upon a piece of metal or "work" it is important that the work pieces be securely clamped to some stationary table to assure accuracy and to reduce the possibility of a work piece from flying off and causing damage and injury. Many work items can be rigidly clamped in a drill press type of vise having parallel jaws that secure the item. But pins, rods and other circular work items cannot be held satisfactorily by parallel jaws and must be secured in a V-block which is normally clamped by the tip of a single screw directed toward the apex of the V. This often adequate for many coarse machining operations but is insufficient clamping for fine production machining because the absence of adequate clamping results in vibrations of the work, the light weight of the V-block also contributes to vibrations of the work and of repeatability when several identical items are needed.

The type of V-block most desired by the production machinist has a heavy ferromagnetic base so that is may be secured to a milling table with clamps or magnetic chuck; contain clamps for securing four or five circular work items that may be have a diameter as small as approximately $\frac{1}{16}$ inch, and have an accuracy that will enable a machinist to mill off identical amounts from all four or five work items without any vibration or chattering of the work.

Briefly described, the production V-block of the invention includes a heavy rectangular steel base with several equally spaced "V-block" shaped grooves laterally milled across the top surface. Overlying half of each "V" groove and an adjacent island between the grooves are jaw members which are vertically adjustable by Allen head machine screws and pairs of steel dowels in the islands. The jaw members include long, dull "V" shaped blades having a length approximately three quarters the length of the "V" shaped grooves. The blades may be extended down to rigidly clamp very small diameter pins as well as large diameter work items in the V-block.

BRIEF DESCRIPTION OF THE DRAWINGS

In the drawings which illustrate a preferred embodiment of the invention.

DETAILED DESCRIPTION OF THE PREFERRED EMBODIMENT

Figure 1:
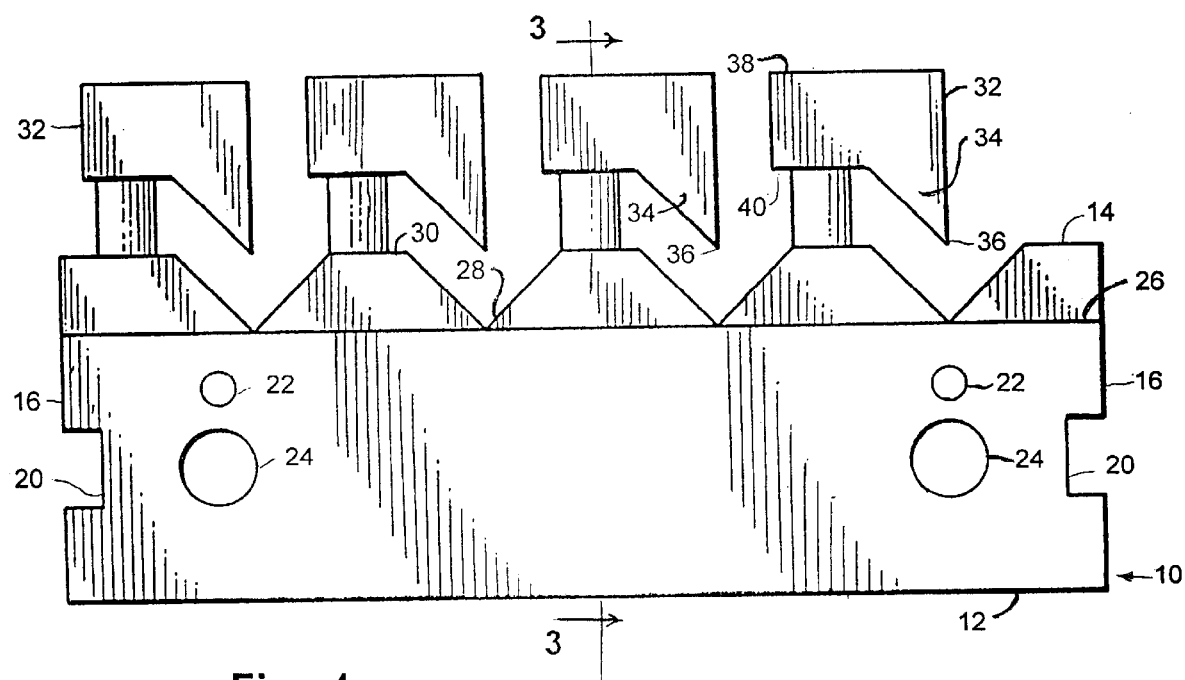
FIG. 1 is an elevational view of a four section production V-block.
Figure 2:
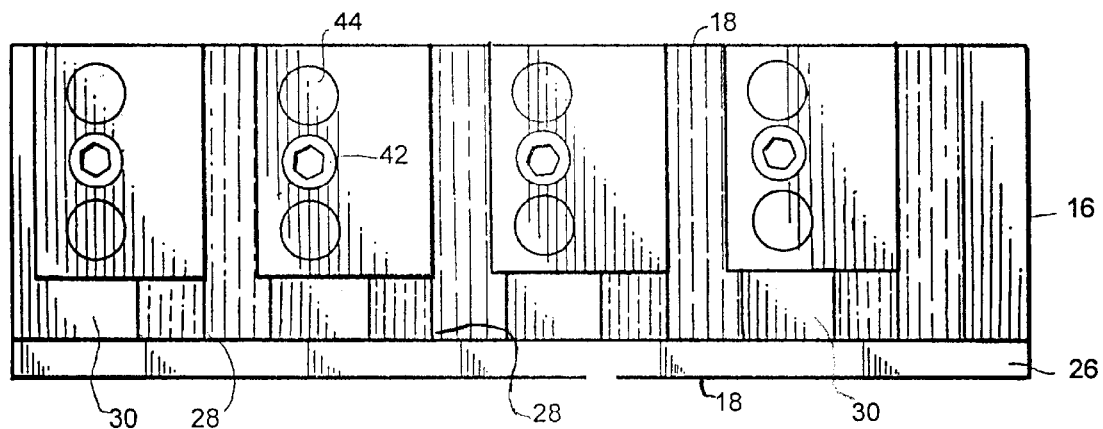
FIG. 2 is a plan view of the V-block of FIG. 1.

The production V-block is formed of an elongated rectangular block 10 of steel having a planar bottom surface 12, a top surface 14 parallel to the bottom surface, end surfaces 16 and parallel side surfaces 18 that are perpendicular to the bottom surface 12. As shown in FIGS. 1 and 2 the steel block 10 has hold-down slots 20 milled in the surface 16 for clamping the V-block to the table of a milling machine or surface grinder and has tapped holes 22 and larger untapped holes 24 through the side surfaces 18 for mounting angle plates.

A rectangular groove parallel to a side surface 18 is milled at a precise and constant depth along one longitudinal edge of the top surface 14 forming a shelf 26 in one side over the length of the block 10. Several equally spaced 90 "V" grooves 28 are milled laterally across the entire top surface 14 to the depth of the shelf 26, leaving small flat islands 30, each at least ¾ inch wide between the "V" grooves 28. Only four "V" grooves 28 are illustrated in the drawings, each may span 1–½ inches between ¾ inch flat islands.

Circular working stock is clamped in the "V" grooves 28 by vertically movable jaw members 32 which overlie the "V" grooves 28 and the islands 30 and have depending triangular jaws 34 with a non-sharp apex 36 that is vertically aligned over the apex of the "V" grooves. Jaws members 32 have planar top surfaces 38 with parallel bottom surfaces 40 which overlie the islands 30. The triangular jaws 34 and the jaw members 32 are approximately ¾ the length of the "V" grooves 28 so that about ¼ of the "V" grooves are exposed to facilitate the quick and easy installation and removal of small diameter work pieces to and from the V-block.

The "V" grooves 28 in the block are angle 90 degrees. The angle between the vertical faces and the angled faces of the triangular jaws 34 is about 43 degrees leaving intentional gaps between the angled surfaces and vertical side surfaces of the V-block jaws to that the apex 36 can bottom out in the "V" groove 28.

Figure 3:
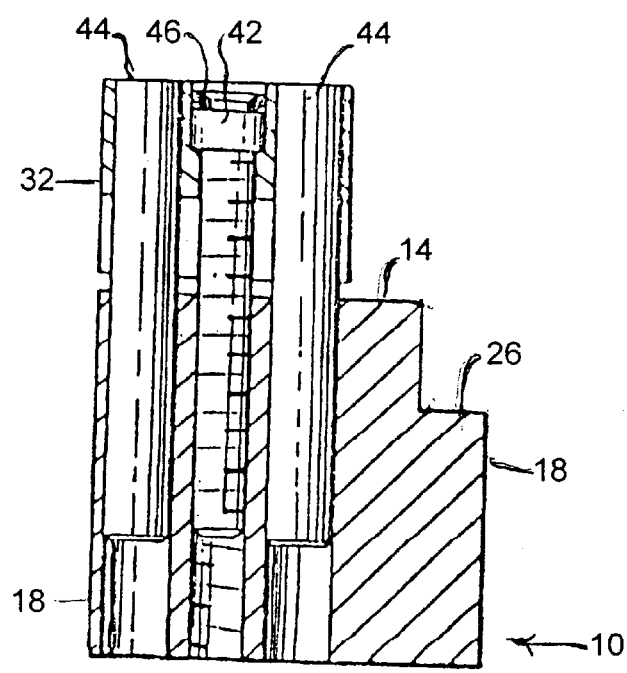
FIG. 3 is a sectional view taken along the lines 3—3 of FIG. 1.

As best shown in the sectional drawing of FIG. 3, the vertically movable jaw members 32 is moved by a socket-headed screw 42 within a deeply countersunk vertical hole centered in the jaw member 32 and passing into a threaded hole into the body of the island 30 which it overlies. The vertical movement of the jaw 32 is also guided by a pair of smooth steel dowels 44 that are firmly secured to the jaw member and which slide into vertical holes in the island 30 beneath the jaw member. The screw 42 is retained in the countersunk hole by a Bellville type, spring steel, cupped washer 46 which is pressed into the hole with the cupped central portion pressed down against the head of the screw. Thus, any attempt to remove the screw will force the rim of the screw against the walls of the countersunk hole to lock the screw. The screw 42 can thus be rotated to raise and lower the jaw member 32.

Figure 4:
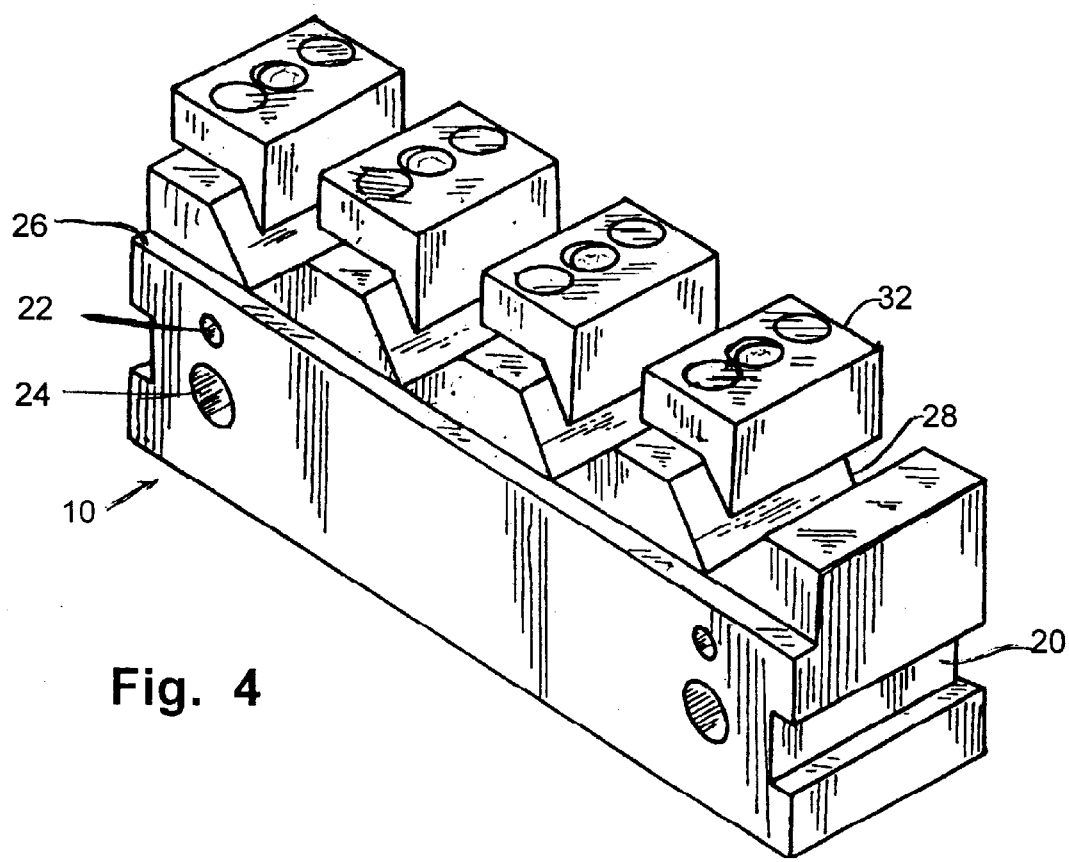
FIG. 4 is perspective view of the V-block.

FIG. 4 is a perspective view of the V-block with four "V" grooves 28 with overlying jaw members 32. V-block with four, five or more "V" grooves and jaw members may be made by extending the rectangular block 10 or by reducing the size of the "V" grooves and the jaw members.

I claim:

1. A production V-block for securing circular work pieces for machining operation, said V-block comprising:

an elongated rectangular ferromagnetic base having planar parallel top and bottom surfaces, parallel side surfaces perpendicular to said top and bottom surfaces, and end surfaces;

a rectangular groove in the intersection of one of said side surfaces with said top surface, said groove having a side surface parallel to said surface of said ferromagnetic base, the bottom surface of said groove forming a shelf in the side surface of said base;

a plurality of lateral "V" grooves across the top surface of said ferromagnetic base, said grooves being equally spaced and between equally islands in said top surface, said grooves being at a constant depth with the apex of each "V" being flush with said shelf; and a plurality of vertically adjustable jaw members overlying said islands and said adjacent "V" grooves, each of said jaw members having a triangular depending jaw with an apex vertically aligned over an apex of a "V" groove in the surface of said base, each of said jaw members being vertically adjustable by a screw locked in said jaw member and extending into the island which it overlies.

2. The production V-block claimed in claim 1 further including hold-down slots in each end surface of said ferromagnetic base for attaching means for securing said V-block to the table of a machine tool.

3. The production V-block claimed in claim 1 further including tapped and untapped holes in said side surfaces and extending laterally through said block for mounting accessory tools to said V-block.

4. The production V-block claimed in claim 1 wherein said "V" grooves in said block are 90 degrees grooves and wherein the triangular depending jaws of each of said overlying jaw members have one vertical face and one slanted face at an angle of approximately 43 degrees to said vertical face, leaving small gaps between the slanted surfaces of said depending jaws and said "V" grooves in said V-block.

5. The production V-block claimed in claim 4 wherein each of said members is limited to vertical adjustment by vertical steel dowels secured in said member and slideable into the island which it overlies and a vertical screw secured for rotation in said jaw members and threaded into said island.

* * * * *